United States Patent

Morrison et al.

[11] Patent Number: 5,411,688
[45] Date of Patent: May 2, 1995

[54] METHOD FOR FORMING PLASTIC MOLDED PANELS WITH INSERTS

[75] Inventors: Clark Morrison, West Bloomfield; Vittorio Strapazzini, Warren, both of Mich.

[73] Assignee: Duotec Products Associates, Troy, Mich.

[21] Appl. No.: 905,799

[22] Filed: Jun. 29, 1992

[51] Int. Cl.⁶ .............................................. B29C 67/22
[52] U.S. Cl. ................... 264/45.4; 264/46.4; 264/139; 264/255; 264/259; 156/245
[58] Field of Search ............. 264/139, 309, 46.4, 264/46.6, 263, 45.4, 46.8, 259, 255; 156/245

[56] References Cited

U.S. PATENT DOCUMENTS

| | | | |
|---|---|---|---|
| 2,744,564 | 5/1956 | Woodburn | 156/223 |
| 3,080,267 | 3/1963 | Schmalz | 428/317.5 |
| 3,546,841 | 12/1970 | Smith et al. | 428/71 |
| 3,616,172 | 10/1971 | Rubens | 264/46.6 |
| 3,647,587 | 3/1972 | MacDonald | 156/71 |
| 3,996,088 | 12/1976 | Crouch | 156/211 |
| 4,307,058 | 12/1981 | Morello et al. | 264/510 |
| 4,323,406 | 4/1982 | Morello | 264/46.4 |
| 4,626,391 | 12/1986 | Taylor | 264/46.6 |
| 4,793,884 | 12/1988 | Horikiri | 156/247 |
| 4,810,452 | 3/1989 | Taillefert et al. | 264/46.4 |
| 4,952,351 | 8/1990 | Parker et al. | 264/46.4 |
| 5,013,813 | 5/1991 | Zimmerman et al. | 528/60 |
| 5,091,031 | 2/1992 | Strapazzini | 156/245 |
| 5,106,874 | 4/1992 | Porter et al. | 528/64 |

*Primary Examiner*—Allan R. Kuhns
*Attorney, Agent, or Firm*—Harness, Dickey & Pierce

[57] ABSTRACT

Plastic panels which are useful as automotive interior trim panels, interior door panels and the like decorative and structural panels, are made by a method which integrates insert sections in the surfaces of the panels and eliminates insert edge trim molding strips. The method includes positioning inserts into a mold, adding plastic to the mold to form a thin plastic sheet, presized blank, then removing the plastic sheet portions with the inserts; next, positioning the blank in a mold against a mold face and molding in situ and simultaneously bonding a plastic substrate against the blank and the exposed surface of the insert. Alternatively the blank can remain in the same mold and a suitable mating half of the mold can close off the plastic sheet and the plastic substrate can be injected or poured into the mold.

7 Claims, 2 Drawing Sheets

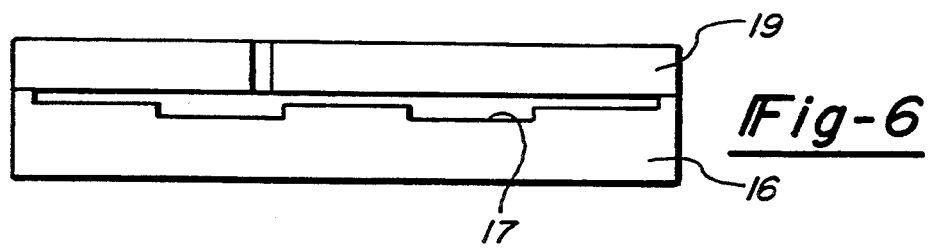
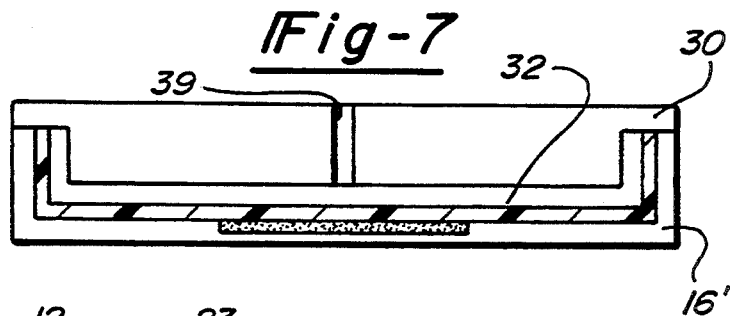
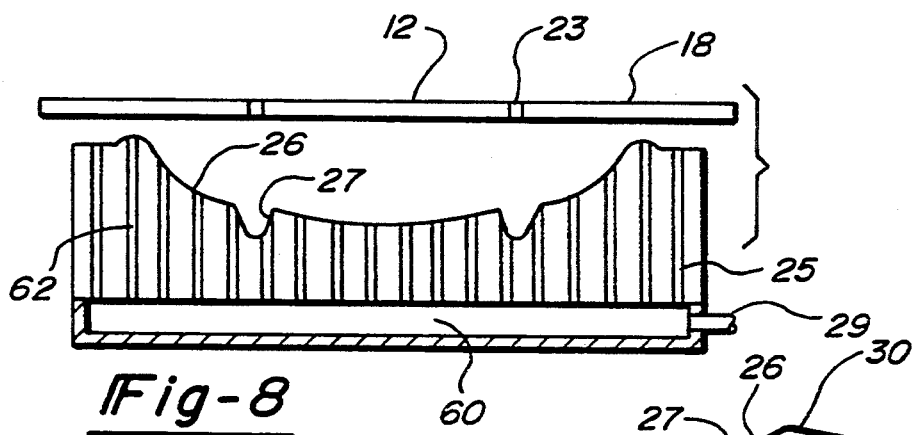
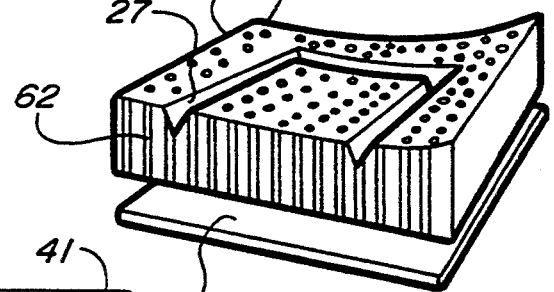
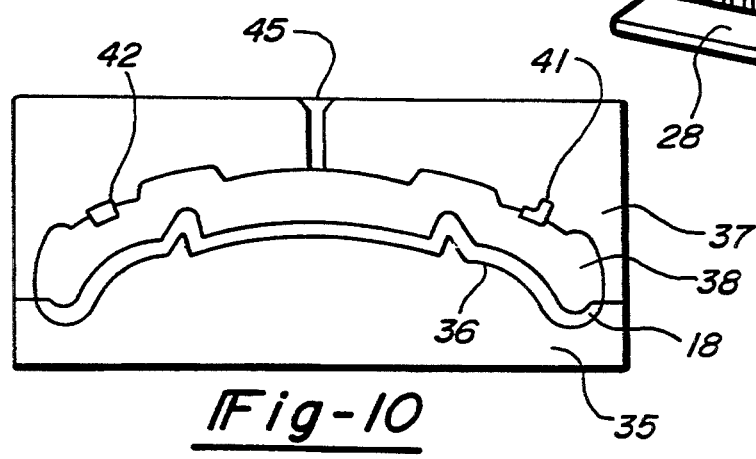

METHOD FOR FORMING PLASTIC MOLDED PANELS WITH INSERTS

BACKGROUND OF THE INVENTION

This invention relates to a composite, molded panel which may be shaped to form an interior door panel or an interior trim panel for a vehicle or to form similar types of panels used for other purposes. It is especially useful in producing vehicle interior door and trim panels having decorative inserts which differ in appearance and composition from other portions of the surfaces of the panels.

Interior door panels for vehicles are typically made by first forming a preselected size and shape foundation board made of stiff particle board, fiber board, or plastic board-like material. Then, one or more cloth-like sheets are fastened to the surface of the board. The board may also function to support other items, such as window regulator parts, small motors, wiring and the like, which are located upon or within the door. In many vehicles, the interior surfaces of the door panels are decoratively enhanced by adding inserts upon the panel. The inserts may be in the form of smaller sections or panels which may be formed, for example, of carpet-like sheets or sheets with heavily textured surfaces or sheets of different surface colors or material. Ordinarily, the joint line that appears around each of these inserts is a high frequency welt line or a fabricated trim strip which overlaps and conceals the raw edges of the insert and helps maintain the insert in place. In many cases it is often a fabricated separately trimmed part which is in some way fastened to the foundation of the door itself.

Typically, the interior door and trim panels of the type described above, are assembled out of separate parts which are positioned upon the foundation board and fastened together, one by one, to provide a complete panel assembly. This assembly is fastened within the metal or plastic door or within other parts of the interior of the vehicle. This technique for manufacturing interior door and trim panels is relatively time-consuming and expensive. Moreover, this limits the ability to significantly contour or curve the interior surfaces of the vehicle. For example, it is difficult to provide a curved or contoured foundation board and to cover such a curved board. Therefore, vehicle interior door surfaces are relatively flat and other trim surfaces are also of limited curvature.

Thus, this invention relates to a plastic molding method for making interior door and trim panels and the like, which may be curved, and which have different inserts molded in place, at reduced costs and with enhanced decorative appearances.

SUMMARY OF INVENTION

The invention herein contemplates molding a plastic panel by, first, preparing a thin, flexible plastic sheet which is sized and shaped to form a blank which sheet-like inserts of various types may be mounted. The inserts are either integrally formed with the sheet or bonded along their edges to the sheet. The blank, with the inserts, is either formed or positioned within a mold. Next, plastic molding material is placed within the mold and is molded in situ to form a relatively rigid plastic molded substrate whose exposed, outer surface is made up of the composite of the plastic sheet blank and the inserts of different materials and textures which are carried by the blank.

Since the substrate is molded in situ within the thin plastic sheet blank, other objects may be simultaneously molded upon or within the substrate. For example, window parts, wires, drain tubes and the like may be molded within the substrate. Alternatively, the substrate may be provided with integral portions that are configured to receive or to mount exterior mechanical parts or trim elements. Thus, this method may economically produce, for example, an interior door panel which may have curved portions and which carries separately mounted or integrally formed arm rests or window controls or other items mounted thereon, while providing an enhanced decorative appearance.

A major object of this invention is to provide a method which produces panels that have inserts of different textures or types of materials for decorative enhancement, but wherein the normal edge trim molding which has been required in the past to conceal and protect the edges of the inserts may be completely eliminated.

Still a further object of this invention is to provide a method for rapidly and economically producing vehicle door panels and interior trim panels and the like with a minimum of labor and with better, more uniform quality than has previously been possible utilizing the typical panel assembly techniques which have been used in the past for making door interior panels and trim panels.

Furthermore, it is the objective of this invention to manufacture the trim face without the use of a converted PVC although PVC can be used, but instead by creating the outer exposed skin of the panel by the use of polyurea polymers in either spray or closed mold techniques.

These and other objects and advantages of this invention will become apparent upon reading the following description, of which the attached drawings form a part.

DESCRIPTION OF DRAWINGS

FIG. 6 is a cross section view of a mold in another embodiment used to form the blank.

FIG. 7 is a cross section view of a mold pair for adding the substrate to the blank.

FIG. 8 is a schematic, cross-sectional illustration of a female, vacuum forming mold with a blank positioned above it.

FIG. 9 is a schematic, fragmentary section of the vacuum mold of FIG. 7, showing insert edge receiving grooves.

FIG. 10 is a schematic illustration of the mold closed by an opposite mold half so as to provide the complete molding cavity.

DETAILED DESCRIPTION

Figure 1:
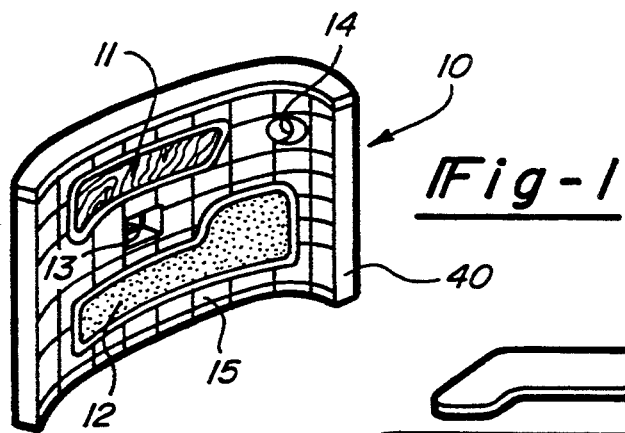
FIG. 1 is a perspective view of an automobile interior door panel which schematically illustrates a panel made in accordance with the method described herein.
Figure 2:
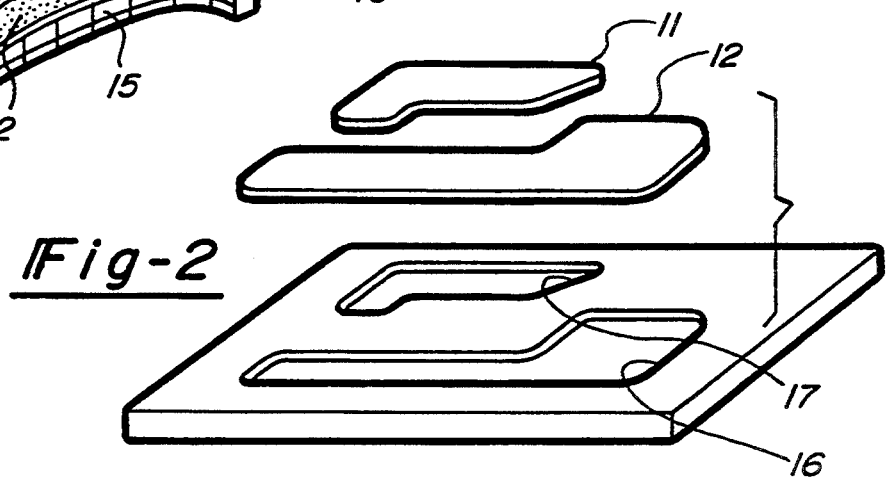
FIG. 2 is a perspective, schematic view illustrating the placement of inserts into a mold.

FIG. 1 schematically illustrates an example of an interior door panel 10 for an automobile. The panel 10 is illustrated as being formed with curved opposite ends. It is sized and shaped to fit within a sheet metal door for trimming the interior of the door within the passenger compartment of a vehicle. The panel includes, for illustration purposes, an upper panel insert 11 which may have an interior face formed so as to simulate a wood grain appearance or may be an inlay of some other material. Similarly, a lower insert 12 is positioned in the panel and may be formed of a pile, carpet-like material, to simulate a carpeted section of the panel or may be an inlay of some other material.

The panel may be provided with various openings or receptacle areas, after the molding is completed, to receive some of the hardware which is typically mounted within a vehicle door. These openings or areas may be cut or punched in the panel. For example, the panel may have a square or oblong opening 13 to receive a block of switches which operate the window actuating motors, and a round opening 14 which may receive a switch for actuating the exterior side view mirrors. Different size and shape openings and receptacle areas may be molded in the panel as required.

The interior surface 15 of the panel may be formed with embossments or may be textured. These decorative surface configurations may be formed during the molding of the panel door or may be preformed in the sheet or blank utilized in the molding.

Figure 3:
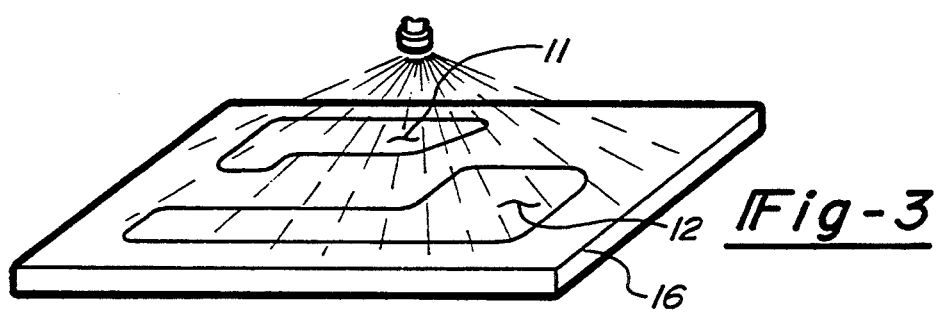
FIG. 3 is a perspective, schematic view illustrating spraying the elastomer into the mold.
Figure 4:
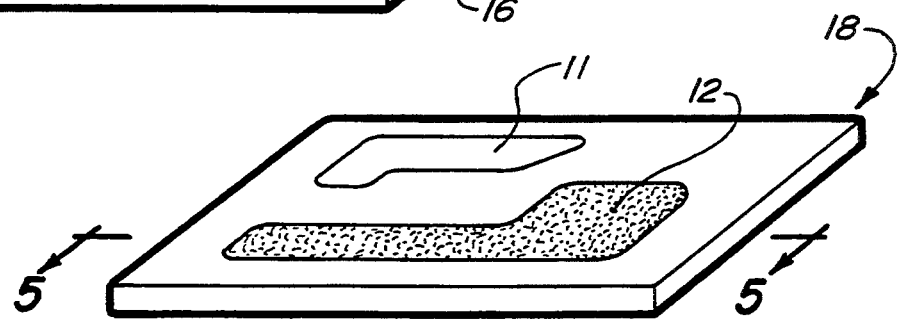
FIG. 4 is a perspective of a blank with the inserts.
Figure 5:
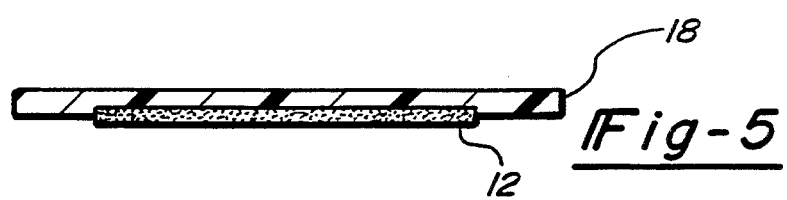
FIG. 5 is a cross section view of FIG. 4 through line 5—5 thereof.

The molding process involves starting with a mold 16 to form a sheet of desirable size to provide a blank 18 for molding purposes. The mold 16 includes cavities 17 to enable positioning of the upper and lower inserts 11 and 12 into the molding. The inserts 11 and 12 are positioned into the mold cavities face down such that their finished surfaces go into the mold cavity 17. A plastic polyurea elastomer is sprayed onto the mold 16 as illustrated in FIG. 3. The polyurethane elastomer is quick curing and bonds to the upper and lower inserts 11 and 12. Preferably, the polyurea elastomers are formed by Jeffamine polyether amine and isocyanates. Also a suitable self skinning type polyurethane may also be used. The mold 16 may be treated with a desired releasing agent if required so that the blank may easily be peeled from the mold and be ready for use in the process. The sheet or blank 18 can be formed to a desired thickness and have desired characteristics. The sheet can be provided with resilient capabilities and provide the desired feel or touch. Alternatively, the mold may include an upper half 19 with an entrance aperture enabling the polyurea elastomer or self skinning polyurethane to be poured or injected into the mold to bond with the upper and lower inserts. This is illustrated in FIG. 6.

In another embodiment of the invention, if it is desirable to remove the portion of the blank behind the inserts, the insert itself may be coated with a release layer and upon curing, the blank may be cut away in the area of the insert to remove the underlining blank portion. Alternatively, the spray process can be computer controlled such that the back of the insert area, if required, is not sprayed. The removal of the underlining blank portion of the sheet which overlaps the insert permits the insert to be arranged substantially coplanar with the sheet and exposes the insert face within a window-like opening in the sheet. Also, the spray may be controlled such that there is an overlap without the blank covering the entire insert.

Next, the blank, in the mold, would be rotated to a second position. At that position, if necessary, wiring, switches, or the like would be positioned onto the blank. If such a positioning of elements is not necessary, the blank would move to another position. At this position, a male mold 30 is mated within the female mold 16' as seen in FIG. 7. The male mold 30 fits into the female mold 16' such that there is a gap 32 between the blank 18 and the male mold 30. The male mold 30 also includes a bore 34 to enable passage of the substrate. If a second layer of less dense foam backing is required, it could be added prior to the substrate either by injection through the male mold or by spraying onto the blank.

A suitable plastic material is injected into the mold cavity 32 for injection molding the panel substrate 40 therein. The injected plastic material solidifies in the cavity 32. Alternatively, expandable plastic beads may be inserted into the mold's cavity, either through passageway 34 or may be placed in the cavity before the mold is closed. The application of suitable heat for the necessary time causes the expandable beads to mold the substrate and seal it within the cavity. After the plastic solidifies, the mold panel 10 is removed. The mold panel substrate 40 may include integral parts such as the molded bracket 46, boss 47 and other separate parts positioned in the interior of the mold cavity. Passageways or openings or receptacles may also be formed in the panel during molding. By way of an example, an electric motor for operating the window, or part of a window regulator mechanism or wires or switches or drain tubing used for draining water collected within the door or the like may be positioned in the panel during molding, as previously stated.

The blank may be placed within a female, vacuum mold 25 which is schematically shown in FIG. 8. This mold includes a molding cavity 26 and grooves 27 which are formed in the cavity surface corresponding to the preformed blank.

The vacuum mold 25 has a vacuum chamber 60 formed beneath it, with a hose 29 connected to a vacuum pump (not shown). Numerous holes 62 extend through the mold from the vacuum chamber to the mold cavity surface. Air is sucked from the cavity surface to the vacuum chamber for positioning the blank on the mold cavity.

Then, as illustrated in FIG. 10, an upper, female mold half 37 is positioned to close the mold cavity 38 for molding the panel substrate 40 upon the molded blank.

The upper mold half 37 may include sub-cavity portions for molding interior parts integrally with the substrate. For example, a sub-cavity portion 41 may be provided for molding a bracket and another sub-cavity portion 42 may be provided for molding a ring or an enlarged boss. In addition, the upper mold half may include a suitable passageway 45 through which plastic may be injected or otherwise placed within the mold cavity.

When the mold is closed, a suitable plastic material may be injected into the mold cavity for injection molding the panel substrate 40 therein. The injected plastic material solidifies in the cavity. Alternatively, expandable plastic beads may be inserted in the mold cavity, either through the passageway 45 or they may be placed in the cavity before the mold is closed. The application of suitable heat for the necessary time causes the expandable beads to mold the substrate in situ within the cavity. After the plastic solidifies the mold panel 10 is removed therefrom.

The molded panel substrate 40 may include integral parts, such as the molded bracket 46, boss 47, and other separate parts positioned in the interior of the mold cavity. Passageways or openings or receptacles also may be formed in the panel during molding. By way of example, an electric motor for operating the window, or part of the window regulator mechanism or wires or switches or drain tubing used for draining water collected within a door, or the like may be positioned in the panel during molding.

The methods described above are particularly useful for molding door panels and, thereby, replacing conventional door panel assemblies which are made up of a number of parts that are fastened together. However, the methods are also useful in forming other types of trim panels for vehicles as well as other types of panels for other uses. For example, an interior dashboard panel may be formed with inserts of various types molded in the surface of the panel. As another example, a molded headliner may be formed for use within the upper part of the passenger compartment of a vehicle. Inserts of various kinds may be positioned in the headliner panel. These inserts can be formed of a sound proofing material or of a decorative carpet-like material, etc.

The molding methods are useful for producing panels made of a wide variety of materials. By way of example, the panel substrate may be formed of a substantially rigid, structural polyurethane plastic which is commercially available from various chemical companies. The particular plastic selected will depend upon the cost, availability, and ultimate use. Various commercially available insert materials, such as pile-like carpet, woven fabric materials or the like can be used for the inserts. The molding can be performed in a suitable, commercially available molding machine.

The overall molded plastic panel is waterproof. Therefore, conventional water shields that typically are utilized within vehicle doors, for protecting the trim panel from water seepage due to water entering into the door cavity, are unnecessary and eliminated. This reduces the cost of the overall door assembly considerably.

This invention may be further developed within the scope of the following claims.

Having fully described an operative embodiment of this invention, I now claim:

1. A method for forming molded plastic panels having inserts, for use as trim panels, interior door panels and the like, comprising the steps of:
   (a) positioning an insert into a first mold;
   (b) adding a polyurea elastomer material into said mold;
   (c) forming a thin, flexible, polyurea sheet, from said polyurea elastomer material, of a predetermined size and shape such that said insert is secured to said polyurea sheet to provide a blank having an outer surface adjacent said first mold and an inner surface on an opposite side of said blank;
   (d) positioning a mating mold adjacent said first mold and forming a cavity between said mating mold and said blank;
   (e) applying and bonding a relatively thick plastic substrate against the inner surface of the blank for bonding together surfaces of the blank and substrate;
   (f) thereafter, removing the molded panel from the mold to provide a composite plastic panel having an exposed exterior surface formed of outer surfaces of the blank and the insert; and
   (g) removing a portion of the sheet, which forms the blank, that overlaps the insert before bonding the substrate to the blank so as to simultaneously bond an inner face of the insert directly to the substrate.

2. A method for forming molded plastic panels as defined in claim 1, including closing the mold before forming the plastic substrate and then, injection molding plastic within the mold to form the substrate within the mold cavity.

3. A method for forming molded plastic panels as defined in claim 1, and including placing expandable plastic beads in the mold and closing the mold and thereafter, expanding the beads for in situ molding of a foamed plastic substrate within the mold cavity.

4. A method for forming molded plastic panels as defined in claim 1, and including molding the substrate out of a substantially rigid polyurethane plastic material.

5. A method for forming molded plastic panels as defined in claim 1, including injecting said polyurea elastomer material into said mold to form said blank.

6. A method of forming molded plastic panels as defined in claim 1, including pouring the said polyurea elastomer material into the said mold to form said blank.

7. A method for forming molded plastic panels, having inserts, for use as trim panels, interior door panels and the like, comprising the steps of:
   (a) positioning an insert into a first mold;
   (b) adding a polyurea elastomer material into said mold;
   (c) forming a thin, flexible, polyurea sheet, from said polyurea elastomer material, of a predetermined size and shape such that said insert is secured to said polyurea sheet to provide a blank having an outer surface adjacent said first mold and an inner surface on an opposite side of said blank;
   (d) removing said blank from said first mold;
   (e) positioning said blank in a second mold such that said blank outer surface is adjacent said second mold;
   (f) positioning a mating mold adjacent said second mold and forming a cavity between said mating mold and said blank;
   (g) applying and bonding a relatively thick plastic substrate against the inner surface of the blank for bonding together surfaces of the blank and substrate;
   (h) thereafter, removing the molded panel from the mold to provide a composite plastic panel having an exposed exterior surface formed of the outer surfaces of the blank and the insert.

* * * * *